May 8, 1923.
H. FÉTAZ
1,454,672
MACHINE FOR THE MANUFACTURE OF BREAD ROLLS
Filed Dec. 5, 1922
2 Sheets-Sheet 1
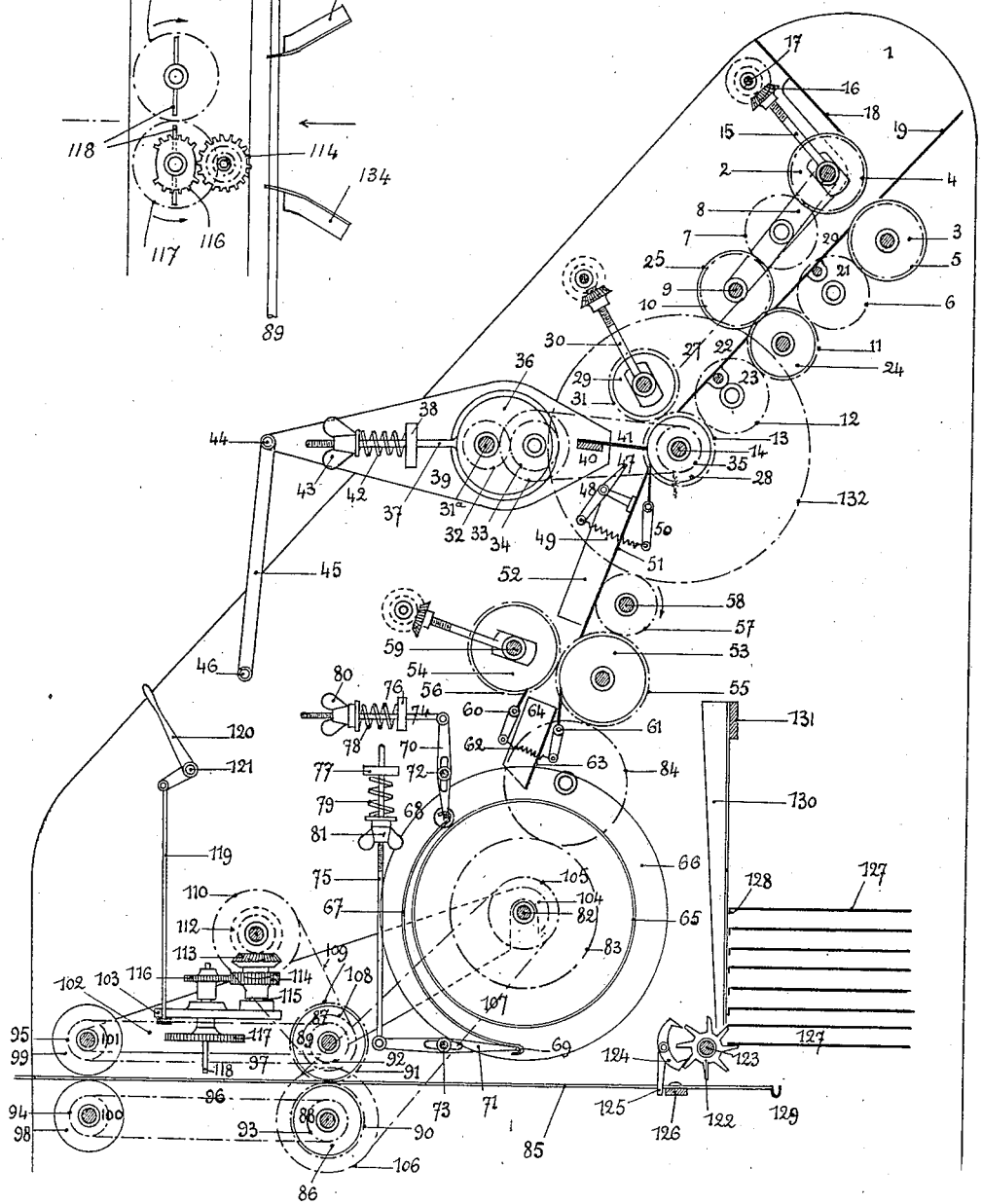
Henry Fétaz
INVENTOR;
By
his Attorney.

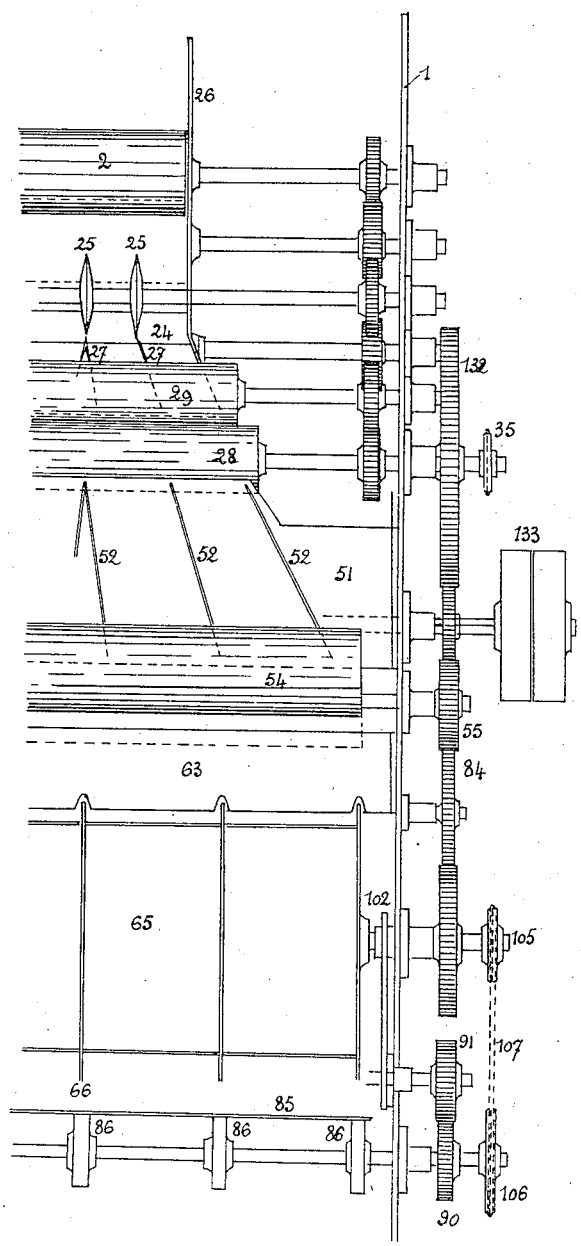

Patented May 8, 1923.

1,454,672

UNITED STATES PATENT OFFICE.

HENRY FÉTAZ, OF PARIS, FRANCE.

MACHINE FOR THE MANUFACTURE OF BREAD ROLLS.

Application filed December 5, 1922. Serial No. 605,068.

*To all whom it may concern:*

Be it known that I, HENRY FÉTAZ, citizen of the French Republic, residing at Paris, in the Republic of France, have invented new and useful Improvements in Machines for the Manufacture of Bread Rolls (for which I have filed an application in France October 28, 1921), of which the following is a specification.

This invention has for its object a machine for the manufacture of crescent-shaped bread and rolls and for disposing the same upon metal plates ready to be put into the oven, without requiring any hand work and consequently, in the best conditions of economy and hygiene.

In the accompanying drawing given by way of example:

Fig. 1 is a side elevation view of a machine constructed in accordance with the invention, wherein a cheek has been removed in order to show the interior mechanism.

Fig. 2 is a half front elevation corresponding thereto.

Fig. 3 is a detail view in plan of the device for placing the crescent-shaped bread in the proper form.

As shown in the drawing, the machine comprises two cheeks or frames 1 between which are disposed the various elements of the machine, which may be entirely enclosed and protected from dust by a sheet metal casing connecting the two cheeks by their edges. At the upper part of the machine is mounted a pair of cylinders 2 and 3 variably spaced apart and actuated by the pinions 4 and 5 which receive their motion from the intermediate pinions 6 and 7 engaging the pinions 10 and 11 which are always in gear. The shaft of the cylinder 2 is journalled at the ends of a pair of levers 8, carrying the axle of the pinion 7 and pivoted upon the hubs of the shaft 9 secured to the cheeks 1.

The spacing of the cylinder 2 from the cylinder 3 is obtained by means of two screw-threaded rods 15 attached to its hub and screwed into the internally screwthreaded bosses of a pair of bevel gears 16 disposed at each end of a shaft 17 which extends through the cheeks. The rolling apparatus as a whole, is completed by the plates 18 and 19 which form a hopper between the cheeks 26.

The dough placed in this hopper is rolled out by the cylinders 2 and 3 to the proper thickness, and is guided by the plate 20 pivoted to the shaft 21 so as to form a scraper, upon the cylinder 24 upon which are caused to roll the circular knives 25, which cut the dough into strips of uniform width. Two knives have been shown (Fig. 2) by way of example, but their number may obviously be as desired without any change in the principles or in the actuating devices.

The strips of dough thus cut up are guided by the plate 22, forming a scraper pivoted on the shaft 23, upon the cylinder 28. The plate 22 has the partitions 27 which oblige the strips to move apart. The cylinder 28 is mounted on shaft 14 which controls through pinions 13 and 31 the motion of a parallel cylinder 29 whose spacing is regulated by the rod 30. Between the cylinders the strips of dough are seized and regularly brought under the transverse knife 41 which cuts them up into pieces. This knife is constituted by a blade secured to a cross-piece 40 connecting two cheeks 39 which are joined together by another cross-piece 38 so as to form a rigid frame. This frame is actuated by an eccentric 36 whose rod 37 actuates the cross-piece 38 through the intermediary of a spring 42, whose pressure may be adjusted by means of a winged nut during the running. The end of the cheeks 39 is pivoted to the end 44 of a link 45 whereof the other end oscillates on the fixed point 46. The eccentric 36 is keyed to a shaft $31^a$ carrying a pinion 32 engaging a pinion 33 secured to a sprocket wheel 34 connected by a chain to the driving sprocket wheel 35 on the shaft 14. The speed of the knife can thus vary and hence the size of the pieces of dough cut up, by a simple change of the pinion 34.

The cutting edge of the blade 41 describes a curve which, by reason of the flexibility of the spring 42, may coincide during a variable space with the surface of the cylinder 28, and has the same speed as the latter, so that the dough is cut up slowly and very exactly, without any tearing off if the speed of the knife is suitably regulated.

In its motion, the blade remains nearly parallel to itself, so that it is enabled, at each cut, to come for cleaning purposes against the scraper 47 pivoted at the point 48 and connected by the spring 49 with another scraper 50 rubbing upon the cylinder 28. In this manner, no particle of the dough can adhere either to the cylinder or to the knife.

When discharged from the latter, the cut pieces slide upon the plate 51 provided with the partitions 52 whereby they are properly directed between the cylinders 53 and 54, having a variable spacing and actuated by the pinions 55 and 56 driven by the pinion 57 mounted on the driving shaft 58.

Scrapers 60 and 61 connected by the spring 62 engage with said cylinders and guide the flat rolled dough upon the plate 63 provided with the partitions 64, for directing them towards a drum 65 of perforated sheet metal which is divided by the cheeks 66 into as many sections as there are descending passages and upon which they spread out flatwise; each section of the drum is surrounded by a flexible band of perforated sheet metal 67 hooked by its two ends 68 and 69 to the ends of two levers 70 and 71 pivoted at 72 and 73 to two shafts traversing the cheeks 1 and 2 and susceptible of slight movements parallel to themselves so as to admit of varying the distance between the flexible band and the drum. The ends of the levers 70 and 71 are acted upon by the rods 74 and 75 bearing upon the thrust bars 76 and 77 secured to the main frame through the intermediary of springs 78 and 79 whose pressure can be regulated, even when running, by the winged nuts 80 and 81. The end 68 of this band carries two loose rollers adapted to roll upon the drum so as to prevent the direct friction of the band 67 and the wear of the same.

The sheet of dough which is drawn forward by the drum will meet with this flexible band and will thus become rolled upon itself, becoming longer as the pressure of the band is made stronger by means of the springs 78 and 79. The drum is mounted upon a shaft 82 carrying a pinion 83 which is actuated by the pinion 55 through the intermediary of the pinion 84.

The roll of dough drops upon the iron plate 85 which is drawn forward by the rollers 86 and 87 whose shafts 88 and 89 carry the pinions 90 and 91 geared together. The shaft 88 is actuated by the drum through the sprocket wheels 105 and 106 and the chain 107.

The shaft 88 is journalled in the cheeks 1 and 2, and the shaft 89 is journalled in the cheeks 102 which are connected by the plate 103 and are secured at the end by the hooks 104 to the hubs of the shaft 82. A link 119 attached at one end to the plate 103 and at the other to one end of the bell-crank lever 120 pivoted at the fixed point 121 admits of raising the combination formed by the cheeks 102 and their cross-piece 103 by rotation on the hub 82 and hence of separating the rollers 86, 87 and stopping the sheet metal plate or starting it by the simple control of a hand lever.

The combination formed by the cheeks 102, their cross-piece 103 and the two roller shafts 89 and 101 constitutes a feeding carriage for the rolled dough pieces. The shaft 101 is also provided with rollers 99 corresponding to the rollers 98 of the shaft 100 secured to the main frame. The shaft 101 is driven from the shaft 89 by means of the sprocket wheels 89 and 95 and the chain 97. Shaft 100 is driven from shaft 88 by means of the sprocket wheels 93 and 94 and the chain 96. The shaft 89 of the carriage 102, 103 has a sprocket 108 actuating by a chain 109, a sprocket 110 mounted upon the shaft 111. This latter actuates the pair of bevel gears 112—113 secured to the pinion 114, mounted on the shaft 115 journalled upon the cross-piece 103.

The pinion 114 engages with a pinion 116 (Figs. 1 and 3) whereof several teeth are removed at both ends of a given diameter; said pinion 116 is keyed to the same shaft as a pinion 117 engaging a second pinion 117' mounted on a parallel shaft likewise journalled in the cross-piece 103. The two pinions 117, 117' respectively carry two shutters 118, whose common axis is horizontal and at right angles to the direction of motion of the plate 85. When inoperative, said shutters are in alignment and in a vertical position and their lower edges come almost into contact with said plate. When a roll of dough is drawn along by said plate 85 and comes before the shutters, it first engages between two guides 134 (Fig. 3) attached to the shaft 89 and which act to slightly curve the end portions of the roll, so that the middle part of the same will alone touch the shutters; the latter will somewhat open, and by this movement they will rotate the pinion 116 which now engages pinion 114 which is constantly driven by the main shaft of the machine. Under the action of the latter, the pinion 116 and hence the said shutters will turn through half a revolution while the said roll is drawn along by the plate and continues to travel. The roll thus passes through the shutters which will then close, so as to bring the ends of the dough roll near the middle, thus giving it exactly the required crescent shape. When the half-revolution is completed, the pinion 116 presents opposite the pinion 114 a fresh portion having no teeth; its rotation ceases, and the shutters are again in position to be actuated by the movement of the succeeding roll.

The formation of the crescent-shaped roll is thus carried out by the movement of the machine, but only when urged by the roll coming before the shutters, so that the action cannot fail to be produced even if the rolls do not come into position at exactly equal intervals of time.

The same machine can be utilized for making small loaves, rolls, etc., which are not formed by a sheet of dough rolled upon itself.

It suffices for this purpose; to remove the cylinder 54 sufficiently away from cylinder 55 so that the dough shall not be further rolled after being cut by the knife; to separate the band 67 from the drum to a greater degree, according to the desired thickness, and to replace the carriage 102, 103 which is simply laid upon the hubs 82, by another which has only the two roller shafts 89 and 101.

Lastly, the machine is completed by a distributor of sheet metal plates such as the plate 85, constituted by vertical guides 130 secured to the cross-pieces 131 of the main frame, and between which plates 127 similar to the plate 85, are piled upon each other; the last plate rests upon the tooth of a star wheel 123 mounted on a shaft secured to the main frame, whereof one tooth can be released by an anchor escapement 124 each time that the projection 125 comes into contact with a tappet 126 secured to the plate. The plate 127 is released and becomes attached to the hook 129 of the preceding plate which draws it forward in its motion and engages it in turn under the entraining rollers 86, 87.

Having now described my invention, what I claim as new and desire to secure by Letters Patent is:

1. A machine for the manufacture of bread rolls comprising in combination a hopper for the dough, a pair of rolling cylinders, means for rotating said cylinders, means for adjusting the distance between said cylinders, an inclined scraper plate for receiving the dough rolled between the cylinders, circular revolving knives adapted to cut up the dough sheet into parallel strips, means for rotating said revolving knives, a receiving cylinder, an inclined scraper plate adapted to receive said dough strips from the revolving knives and to deliver them upon said receiving cylinder, a pressing cylinder adapted to press the dough strips upon the receiving cylinder, a transverse knife blade adapted to cooperate with the receiving cylinder for cutting up the dough strips into pieces, a supporting link pivoted at one end to a fixed point, a knife holder for supporting said knife blade pivotally connected to the free end of said link, a driving eccentric, a spring connection between said driving eccentric and the knife holder, an inclined scraper plate adapted to receive the pieces of dough cut up by said knife blade, a flat receiver, means for guiding the dough pieces onto said receiver and means for feeding said receiver.

2. A machine for the manufacture of bread rolls comprising in combination a hopper for the dough, a pair of rolling cylinders, means for rotating said cylinders, means for adjusting the distance between said cylinders, an inclined scraper plate for receiving the dough rolled between the the cylinders, circular revolving knives adapted to cut up the dough sheet into parallel strips, means for rotating said revolving knives, a receiving cylinder, an inclined scraper plate adapted to receive said dough strips from the revolving knives and to deliver them upon said receiving cylinder, a pressing cylinder adapted to press the dough strips upon the receiving cylinder, a transverse knife blade adapted to cooperate with the receiving cylinder, for cutting up the dough strips into pieces, a supporting link pivoted at one end to a fixed point, a knife holder for supporting said knife blade pivotally connected to the free end of said link, a driving eccentric, a spring connecting between said driving eccentric and the knife holder, an inclined scraper plate adapted to receive the pieces of dough cut up by said knife blade, a pair of rolling cylinders between which said dough pieces are rolled, an inclined scraper plate below said rolling cylinders, winding means adapted to roll said dough pieces upon themselves, a flat receiver adapted to receive the rolled up dough pieces and means for feeding said flat receiver.

3. A machine for the manufacture of bread rolls comprising in combination a hopper for the dough, a pair of rolling cylinders, means for rotating said cylinders, means for adjusting the distance between said cylinders, an inclined scraper plate for receiving the dough rolled between the cylinders, circular revolving knives adapted to cut up the dough sheet into parallel strips, means for rotating said revolving knives, a receiving cylinder, an inclined scraper plate adapted to receive said dough strips from the revolving knives and to deliver them upon said receiving cylinder, a pressing cylinder adapted to press the dough strips upon the receiving cylinder, a transverse knife blade adapted to cooperate with the receiving cylinder for cutting up the dough strips into pieces, a supporting link pivoted at one end to a fixed point, a knife holder for supporting said knife blade pivotally connected to the free end of said link, a driving eccentric, a spring connecting between said driving eccentric and the knife holder, an inclined scraper plate adapted to receive the pieces of dough cut up by said knife blade, a pair of rolling cylinders between which said dough pieces are rolled, an inclined scraper plate below said rolling cylinders, a rotating drum, a stationary arcuated plate, means for resiliently holding said arcuated plate at an adjustable distance from the periphery of the drum, a flat receiver adapted to receive the rolled up dough pieces delivered by the drum and means for feeding said flat receiver.

4. A machine for the manufacture of bread rolls comprising in combination a hopper for the dough, a pair of rolling cylinders, means for rotating said cylinders, means for adjusting the distance between said cylinders, an inclined scraper plate for receiving the dough rolled between the cylinders, circular revolving knives adapted to cut up the dough sheet into parallel strips, means for rotating said revolving knives, a receiving cylinder, an inclined scraper plate adapted to receive said dough strips from the revolving knives and to deliver them upon said receiving cylinder, a pressing cylinder adapted to press the dough strips upon the receiving cylinder, a transverse knife blade adapted to cooperate with the receiving cylinder for cutting up the dough strips into pieces, a supporting link pivoted at one end to a fixed point, a knife holder for supporting said knife blade pivotally connected to the free end of said link, a driving eccentric, a spring connecting between said driving eccentric and the knife holder, an inclined scraper plate adapted to receive the pieces of dough cut up by said knife blade, a pair of rolling cylinders between which said dough pieces are rolled, an inclined scraper plate below said rolling cylinders, a rotating drum a stationary arcuated plate, means for resiliently holding said arcuated plate at an adjustable distance from the periphery of the drum, a flat receiver adapted to receive the rolled up dough pieces delivered by the drum, driving means for feeding said flat receiver and means actuated by said driving means for giving a crescent shape to the rolled up pieces of dough.

In testimony whereof I have signed my name to this specification.

HENRY FÉTAZ.